United States Patent
Tummala et al.

(10) Patent No.: US 11,297,009 B2
(45) Date of Patent: Apr. 5, 2022

(54) COMPLETE AUTOZONING IN FIBRE CHANNEL SANS

(71) Applicant: Cisco Technology, Inc., San Jose, CA (US)

(72) Inventors: Venu Gopal Tummala, Karnataka (IN); Harsha Bharadwaj, Bangalore (IN); Sunil John Varghese, Bangalore (IN); Pramod Menon, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/839,486

(22) Filed: Apr. 3, 2020

(65) Prior Publication Data
US 2021/0314279 A1 Oct. 7, 2021

(51) Int. Cl.
*H04L 12/931* (2013.01)
*H04L 12/751* (2013.01)
*H04L 29/06* (2006.01)
*G06F 13/42* (2006.01)
*H04L 29/08* (2006.01)
(Continued)

(52) U.S. Cl.
CPC ........ *H04L 49/357* (2013.01); *G06F 13/4221* (2013.01); *H04L 45/02* (2013.01); *H04L 49/506* (2013.01); *H04L 63/0281* (2013.01); *H04L 67/1097* (2013.01); *G06F 2213/0026* (2013.01); *G06F 2213/0036* (2013.01)

(58) Field of Classification Search
CPC ..... H04L 49/357; H04L 45/02; H04L 49/506; H04L 63/0281; H04L 67/1097; G06F 13/4221
See application file for complete search history.

(56) References Cited

U.S. PATENT DOCUMENTS

| | | | |
|---|---|---|---|
| 9,699,027 B2 | 7/2017 | Bharadwaj et al. | |
| 2005/0198523 A1* | 9/2005 | Shanbhag | H04L 49/357 726/22 |

(Continued)

OTHER PUBLICATIONS

"Fibre Channel Functional Overview", downloaded Aug. 1, 2019, http://www.sanog.org/resources/sanog8/sanog8-san-functional-overview-asimkhan.pdf, 47 pages.
(Continued)

*Primary Examiner* — Phong H Dang
(74) *Attorney, Agent, or Firm* — Edell, Shapiro & Finnan, LLC (57) ABSTRACT

An initiator emulator is implemented on a control plane of a switch fabric connected to target ports of a storage array having storage configured with logical partitions. After an initiator port of a server logs into the switch fabric and is blocked from discovering the target ports, the initiator emulator, acting as proxy for the initiator port, discovers information that indicates logical partition masking enforced at the target ports for the initiator port. The initiator emulator determines allowed (initiator (I), target (T)) (I, T) port combinations that should be allowed access via the switch fabric based on the information from the discovery. The initiator emulator configures the switch fabric with one or more zones based on the allowed (I, T) port combinations. The initiator emulator then sends to the initiator port an indication of a zone change to the switch fabric.

20 Claims, 10 Drawing Sheets

(51) Int. Cl.
  *H04L 49/356* (2022.01)
  *H04L 49/506* (2022.01)
  *H04L 45/02* (2022.01)
  *H04L 67/1097* (2022.01)

(56) References Cited

U.S. PATENT DOCUMENTS

| | | | | |
|---|---|---|---|---|
| 2007/0112974 | A1* | 5/2007 | Shirogane | H04L 69/40 709/239 |
| 2012/0236721 | A1 | 9/2012 | Dang et al. | |
| 2012/0308232 | A1* | 12/2012 | Eisenhauer | H04L 49/357 398/45 |
| 2012/0311224 | A1* | 12/2012 | Myrah | H04L 49/455 710/316 |
| 2014/0143453 | A1* | 5/2014 | Myrah | G06F 13/4022 710/19 |
| 2016/0087841 | A1* | 3/2016 | Bharadwaj | H04L 41/18 709/221 |
| 2017/0317918 | A1* | 11/2017 | Vemula | H04L 49/357 |
| 2018/0063004 | A1 | 3/2018 | Uppunda et al. | |
| 2019/0319846 | A1* | 10/2019 | Dhanadevan | H04L 41/12 |

OTHER PUBLICATIONS

Cisco, "Design a Reliable and Highly Available Fibre Channel SAN White Paper", Document ID:1487867880349182, https://www.cisco.com/c/en/us/products/collateral/storage-networking/mds-9700-series-multilayer-directors/white-paper-c11-738426.html, Feb. 23, 2017, 52 pages.

Cisco, "Cisco MDS 9000 Series Release Notes, Release 8.4(1)", Jun. 30, 2019, https://www.cisco.com/c/en/us/td/docs/switches/datacenter/mds9000/sw/8_x/release_notes/mds_nxos_m_8_4_1.html, 32 pages.

Jon Tate et al., "IBM SAN Survival Guide", International Technical Support Organization, IBM San Survival Guide, Aug. 4, 2003. http://www.redbooks.ibm.com/redbooks/pdfs/sg246143.pdf, 662 pages.

Smith, Erik, "Introducing Target Driven Zoning (TDZ)", https://brasstacksblog.typepad.com/brass-tacks/2012/01/introducing-target-driven-zoning-tdz.html, Jan. 16, 2012, 12 pages.

Cisco, "Configuring and Managing Zones", Cisco MDS 9000 Series Fabric Configuration Guide, Release 8.x , https://www.cisco.com/c/en/us/td/docs/switches/datacenter/mds9000/sw/8_x/config/fabric/cisco_mds9000_fabric_config_guide_8x/configuring_and_managing_zones.html#concept_1887618867132338944665 83187770715), Mar. 23, 2020, 112 pages.

* cited by examiner

802 — FOR EACH NEW INITIATOR PORT THAT DOES AN FLOGI INTO THE SWICH FABRIC {

804 — FOR EACH TARGET PORT ALREADY LOGGED INTO THE SAME VSAN AS THE INITIATOR PORT {

806 — ACTIVATE AN ACL TRAP ENTRY FOR THE INITIATORFCID, SPLOXID ON THE TARGET F-PORT.

807 — PERFORM PLOGI AND PRLI WITH HOST CREDENTIALS (SID, PWWN OF THE INITIATOR PORT WITH ALL OTHER PARAMETERS AS DEFAULTS).

808 — IF THE INITIATOR PORT AND THE TARGET PORT HAVE (FC-4TYPE==SCSI) IN NAME SERVER {

812 {
            SEND A SCSI REPORT_LUN TO LUN=0.
                IF (RESPONSE STATUS==SUCCESS WITH LUN LIST) (//FAILURE OR NULL LUN LIST MEANS THAT (I, T) PORT PAIR CANNOT BE ZONED),
                    (I, T) PORT TUPLE CAN BE COMBINED TO FORM A ZONE.
        }

810 — ELSE IF THE INITIATOR PORT AND THE TARGET PORT HAVE (FC-4TYPE==NVME) {

814 {
            SEND IDENTIFY COMMAND WITH CNSVALUE=0X02 USED FOR ACTIVE NSID DISCOVERY.
            IF (RESPONSE STATUS==SUCCESS WITH AT LEAST ON ACTIVE NSID {
                (I, T) PORT TUPLE CAN BE COMBINED TO FORM A ZONE.
            }
        }

816 — PERFORM A LOGO TO FREE RESOURCES AT AN HBA OF THE TARGET PORT.
        818 — DEACTIVATE THE ACL TRAP ENTRY ON THE TARGET F-PORT.
    }
}

ACTIVATE ALL THE (I, T) PORT PAIRS FROM THE ABOVE AS ZONES IN THE SWITCH FABRIC.

COMPLETE AUTOZONING IN FIBRE CHANNEL SANS

TECHNICAL FIELD

The present disclosure relates to zoning in a Fibre Channel (FC) switch fabric.

BACKGROUND

A Fibre Channel (FC)-storage area network (SAN) (FC-SAN) implements logical unit number (LUN) masking on a storage array of the FC-SAN and zoning on a switch fabric of the FC-SAN. Manually implemented zoning is complex, time consuming, and error-prone especially in large SANs. As an alternative, Target Driven Zoning (TDZ) has been proposed by some, but not all, vendors of equipment for FC-SANs. TDZ requires that both the storage array and switches in the switch fabric support the TDZ. A lack of TDZ support by all storage array and switch vendors presents a problem of completeness and hence adoption by customers.

DESCRIPTION OF EXAMPLE EMBODIMENTS

Overview

An initiator emulator is implemented on a control plane of a switch fabric connected to target ports of a storage array having storage configured with logical partitions. After an initiator port of a server logs into the switch fabric and is blocked by the switch fabric from discovering the target ports as a result of there being no zones configured in the switch fabric for the initiator port, the initiator emulator acts as proxy for the initiator port to discover information that indicates logical partition masking enforced at the target ports for the initiator port. The initiator emulator determines allowed (initiator (I), target (T)) (I, T) port combinations that should be allowed access via the switch fabric based on the information from the discovery. The initiator emulator configures the switch fabric with one or more zones based on the allowed (I, T) port combinations. The initiator emulator then sends to the initiator port a notification of a zone change in the switch fabric (e.g., sends an registered state change notification (RSCN)).

Example Embodiments

Figure 1:
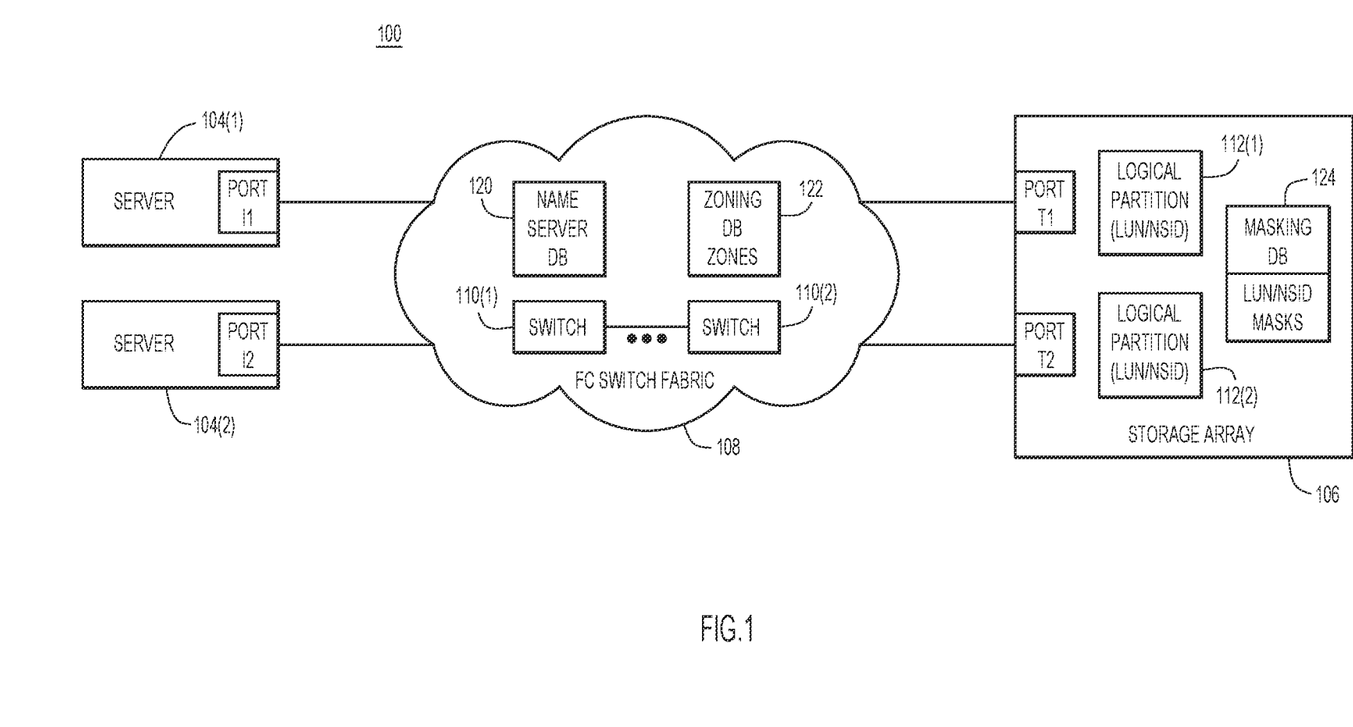
FIG. 1 is a block diagram of a Fibre Channel (FC)-storage array network (SAN) (FC-SAN) in which switch fabric zoning and logical unit number (LUN) masking may be implemented, according to example embodiment.

With reference to FIG. 1, there is a block diagram of an example FC-SAN 100 in which switch fabric zoning (referred to simply as "zoning') and storage array LUN masking (referred to simply as "LUN masking") may be implemented. LUN masking may be referred to more generally as "logical partition masking," for reasons that will become apparent from the ensuing description. FC-SAN 100 includes servers or hosts 104(1) and 104(2) (collectively referred to as "servers 104"), a storage array 106 for storing a large volume of data, and an FC switch fabric 108 (also referred to simply as a "switch fabric 108") connected to the servers and the storage array. Switch fabric 108 includes multiple FC switches 110(1)-110(2) (collectively referred to as "FC switches 110") connected with each other, servers 104, and storage array 106 via switch ports of the FC switches (not shown). FC switches 110 may communicate with each other over inter-switch links (ISLs). By way of example, servers 104, storage array 106, and FC switches 110 of switch fabric 108 and their respective server/host ports, storage array ports, and switch ports all support/operate in accordance with an FC-based protocol. Examples include, but are not limited to, the Small Computer System Interface (SCSI)-FC protocol (SCSI-FCP) and the FC-Non-Volatile Memory Express (NVMe) (FC-NVMe) protocol. In FC-NVMe and SCSI-FCP, servers 104, storage array 106, and FC switches 110 are configured to exchange FC frames transporting NVMe Input/Output (I/O) and SCSI I/O operations, respectively.

Server 104(1) includes a server port I1 hosted on a host bus adaptor (HBA) (not shown) and connected to a corresponding switch port of one of FC switches 110 in switch fabric 108 (also not shown). Server 104(1) communicates with switch fabric 108 through server port I1. Similarly, server 104(2) includes a server port I2 hosted on an HBA and connected to a corresponding switch port of switch fabric 108. Server 104(2) communicates with switch fabric 108 through server port I2. Server ports I1 and I2 may be assigned, and globally identified by, respective port World Wide Names (pWWNs) (also referred to as World Wide Port Names (WWPNs)). Also, when server ports I1 and I2 log into switch fabric 108 using Fabric Login (FLOGI), for example, switch fabric 108 assigns to the server ports respective FC identifiers (FCIDs). Servers 104 and server ports I1 and I2 may be referred to generally as "initiators." Also, server ports I1 and I2 may be referred to more specifically as "initiator ports."

Storage array 106 includes physical storage divided into two logical partitions 112(1) and 112(2) identified by logical partition identifiers. For SCSI, the logical partitions are referred to as logical units and are identified by logical unit numbers (LUNs), e.g., LUN1 or L1 and LUN2 or L2. For NVMe, the logical partitions are each referred to as a "namespace" (NS) and are identified by NS identifiers (IDs) (NSIDs). Storage array 106 also includes storage array ports T1 and T2 hosted on HBAs and connected to corresponding switch ports (e.g., F-ports) on an edge of switch fabric 108 (not shown in FIG. 1). Storage array ports T1 and T2 may be assigned, and globally identified by, respective pWWNs. Also, when storage array ports T1 and T2 log into switch fabric 108 using FLOGI, for example, the switch fabric assigns to the storage array ports respective FCIDs. In operation, servers 104 perform I/O operations (e.g., read and write operations) on logical partitions 112(1), 112(2) over switch fabric 108 through an exchange of FC frames between severs ports I1, I2 and storage array ports T1, T2. Storage array 106 and storage array ports T1, T2 may be referred to generally as "targets." Also, storage array ports T1, T2 may be referred to more specifically as "target ports."

Switch fabric 108 stores and maintains a name server database (DB) 120 that stores a list of identifiers of server ports and target ports that are logged into the switch fabric at any given time. Switch fabric 108 also includes a zone server configured to store and maintain a zoning database 122. Zoning database 122 stores definitions of one or more zones configured on, and enforced by, switch fabric 108, as will be described below. Storage array 106 includes a logical partition masking database 124 that stores logical partition masking configurations used by the storage array to control initiator port access to logical partitions 112(1), 112(2) through target ports T1, T2, as will be described below.

It is understood that FIG. 1 is only one example, and that the FC-SAN may include many more servers, server ports, FC switches, and target ports.

FC-SANs generally implement both logical partition masking and zoning, as described below.

Zoning is an authorization feature configured on switch fabric 108 that provides for communication security by segregation of devices (e.g., initiator ports and target ports) and allowing I/O only among these devices. The segregation also allows for better management of large switch fabrics. Zoning defines zones of pWWNs that identify boundaries of which initiator ports of servers 104 are allowed/permitted to access/communicate with which target ports of storage array 106. The rules/definitions that define the zones are stored in zoning database 122 of switch fabric 108. Zoning is enforced at an edge of switch fabric 108, i.e., on the F-ports of the switch fabric, connected to target ports T1, T2 and initiator ports I1, I2 based on the stored rules/definitions. Enforcement includes programming on the F-ports access control lists (ACLs) of the form "(source identifier (SID), destination identifier (DID))=Permit," which allows only frames between zoned devices to communicate via switch fabric 108.

Related to the zoning is logical partition masking. Logical partition masking is described below primarily in the context of LUN masking, by way of example. It is understood that the techniques presented also apply to NSID masking. LUN masking is an additional authorization mechanism that ensures only authorized initiator ports (e.g., initiator ports I1, I2) access a specific/particular LUN (e.g., logical partition 112(1)/LUN1 or logical partition 112(2)/LUN2). LUN masking is configured in storage array 106 as a list of initiator ports that are allowed access to a LUN behind a target port (e.g., target port T1 or T2). That is, LUN masking is configured with rules that specify which initiator ports are able to access a particular LUN on a particular target port. The LUN masking rules/configurations are stored in LUN masking database 124 of storage array 106. Additionally, access to LUNs is restricted via a specific set of target ports only. LUN masking is enforced on storage array 106 by blocking all I/O access from initiator ports to prohibited LUNs, and also blocking discovery of LUNs that are masked for a given initiator port. LUN masking may not be implemented as a security measure per se, but rather as a protection against misbehaving initiator ports, which may corrupt LUNs belonging to other servers.

Figure 2:
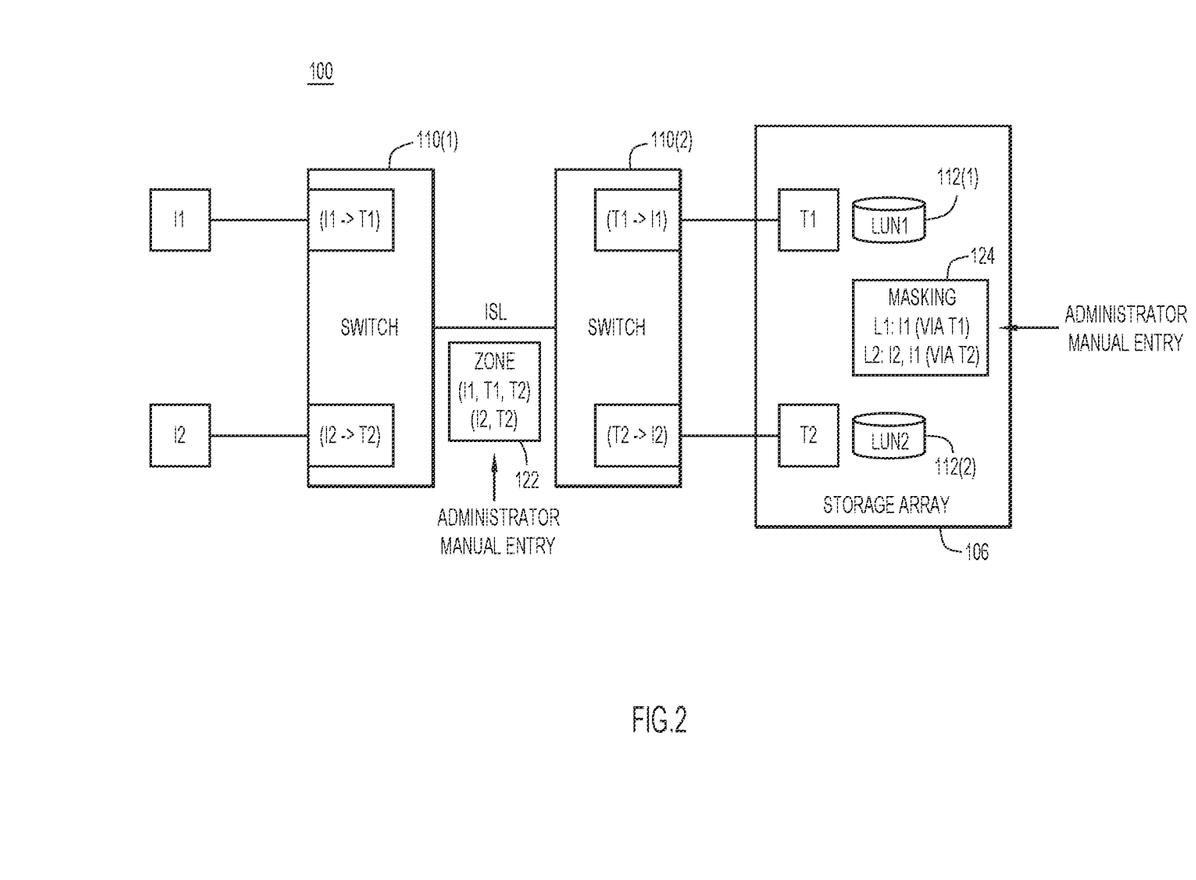
FIG. 2 is an illustration of manually configuring zoning and LUN masking on a switch fabric and a storage array of the FC-SAN, according to example embodiment.

With reference to FIG. 2, there is an illustration of manually configuring zoning and LUN masking on switch fabric 108 and storage array 106 of FC-SAN 100. In the example of FIG. 2, logical partitions 112(1), 112(2) represent LUNs LUN1, LUN2. Also, in the example of FIG. 2, an administrator manually configures the zoning rules/definitions in zoning database 122 and the LUN masking in LUN masking database 124. The zoning rules/definitions configured in zoning database 122 include (i) a first entry or tuple of port identifiers (I1, T1, T2), which permits initiator port I1 access to target ports T1, T2, through switch fabric 108, and (ii) a second entry or tuple (I2, T2), which permits initiator port I2 access to target port T2, only, through the switch fabric.

Assuming LUN1 and LUN2 have respective LUN identifiers L1 and L2, the LUN masking configuration in LUN masking database 124 includes (i) a first LUN masking entry (L1:I1 (via T1)), which permits initiator port I1 access to LUN1 (L1) via target port T1, and (ii) a second LUN masking entry (L2:I2, I1 (via T2)), which permits initiator ports I2, I1 access to LUN2 (L2) via target port T2.

Disadvantageously, manually configuring zoning is complex and error prone, especially in large FC-SANs. The configuration of authorization in FC-SANs requires two manual steps, including configuring the LUN masking in storage array 106, and configuring the zoning rules in switch fabric 108. Manual entry of the zoning/LUN masking information is error prone, due to entry of pWWNs, for example.

Figure 3:
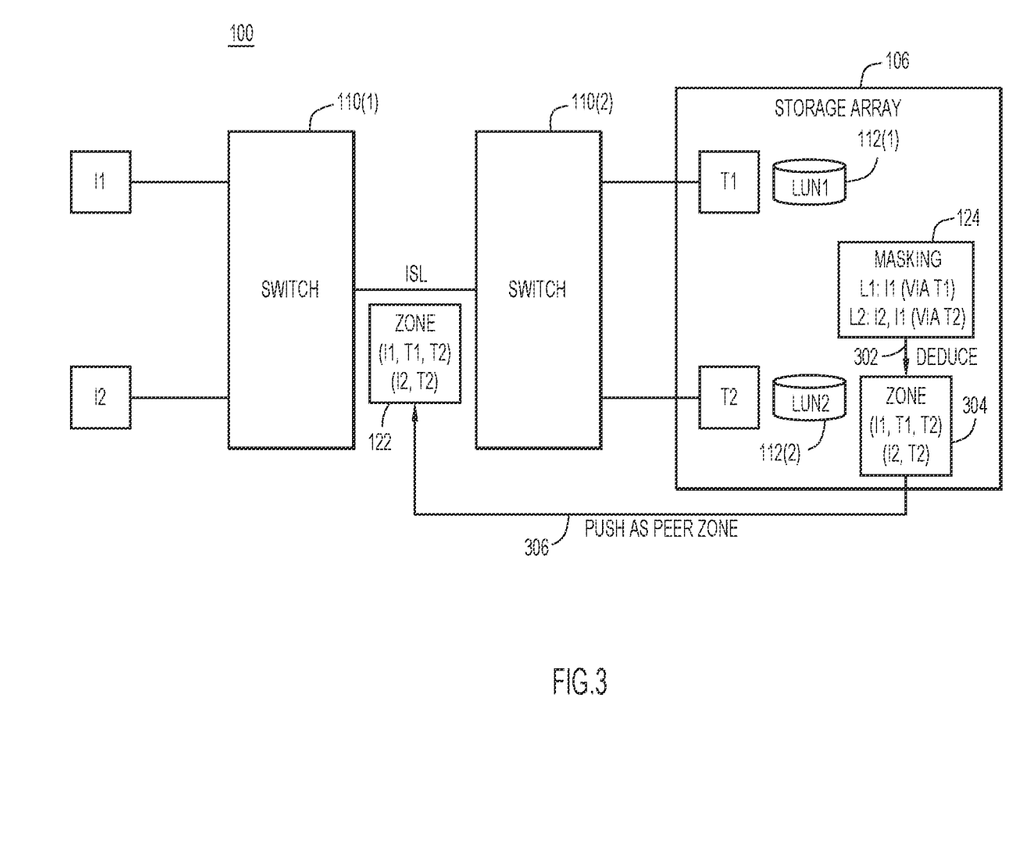
FIG. 3 is an illustration of target driven zoning (TDZ) of the switch fabric, according to an example embodiment.

With reference to FIG. 3, there is an illustration of target driven zoning (TDZ) of switch fabric 108 of FC-SAN 100. TDZ is performed in accordance with a peer zoning scheme of the International Committee for Information Technology Standards (INCITS) T11 FC-Generic Services (FC-GS) (referred to simply as the "T11 standards"). Prior to executing TDZ, an administrator manually enters the LUN masking in storage array 106, as described above. Next, at 302, storage array 106 deduces, from the LUN masking, zone information 304 in the form of pairs of valid or allowed (initiator (I), target (T)) port tuples. Next, at 306, storage array 106 pushes zone information 304 to switch fabric 108 as a "peer zone" in accordance with the peer zoning scheme. Switch fabric 108 receives the peer zone, and configures/activates the zone in the switch fabric. TDZ disadvantageously requires that both storage array 106 and switch fabric 108 implement TDZ. In practice, a lack of TDZ vendor support by all storage array and switch fabric vendors presents a problem with completeness, and hence adoption of TDZ by customers. Thus, there is a need for a zone automation solution that does not require support by more than one vendor.

As described below, logical partition discovery, e.g., LUN discovery, forms a basis for embodiments presented herein. More specifically, the embodiments use a form of LUN discovery that modifies conventional LUN discovery, by which an initiator port normally discovers LUNs that are accessible to the initiator port, i.e., which LUNs on the storage array have been provisioned for the initiator port. Conventional LUN discovery is described first, so that the modifications thereto employed by the embodiments presented herein will become apparent. In conventional LUN discovery, an initiator port (e.g., initiator port I1) originates and exchanges LUN discovery commands with a target port (e.g., target port T1) over switch fabric 108 to discover LUN masking, i.e., which LUNs on a storage array (e.g., storage array 106) are accessible to the initiator port through the target port. In SCSI, the LUN discovery commands are called REPORT_LUNS commands, including a REPORT_LUNS request and a REPORT_LUNS response, which operate as follows. The initiator (I) port of a server sends to the target (T) port of a storage array the REPORT_LUNS request to request an inventory report of the LUNs that are accessible to the (I, T) port pair. In response, the target port sends to the initiator port that sent the query a REPORT_LUNS response that lists only the LUNs in the LUN masking view of that initiator port. Only when the REPORT_LUN response reports a LUN does the initiator port attempt to mount the LUN.

Figure 4:
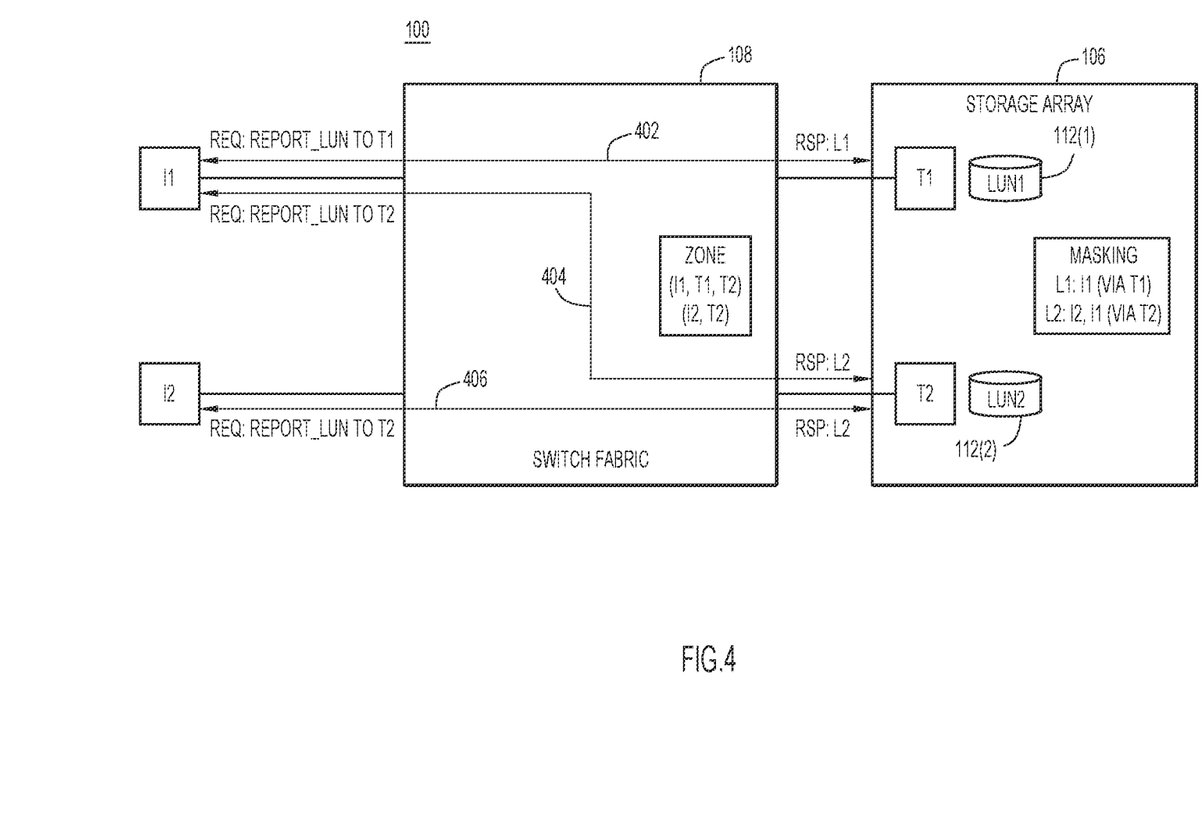
FIG. 4 is an illustration of conventional LUN discovery performed in the FC-SAN, according to an example embodiment.

With reference to FIG. 4, there is an illustration of an example of conventional LUN discovery performed in FC-SAN 100. As shown in FIG. 4, initiator port I1 exchanges with target port T1 REPORT_LUN commands 402, including a REPORT_LUN request REQ and a REPORT_LUN response RSP. Response RSP (RSP:L1) from target port T1 indicates LUN L1 is accessible to initiator port I1 (via target port T1). Similarly, initiator port I1 exchanges with target port T2 REPORT_LUN commands 404, including REPORT_LUN request/response REQ/RSP. Response RSP (RSP:L2) from target port T2 indicates LUN L2 is accessible to initiator port I1 (via target port T2). In addition, initiator port I2 exchanges with target port T2 REPORT_LUN commands 406, including REPORT_LUN request/response REQ/RSP. Response RSP (RSP:L2) from target port T2 indicates LUN L2 is accessible to initiator port I2 (via target port T2).

In NVMe, a LUN becomes an NSID and a REPORT_LUN command equivalent is an IDENTIFY command. The IDENTIFY command with a Controller or Namespace Structure (CNS) value=0x02 returns a list of active NSIDs to the controller (i.e., initiator)/target port combination. All future references to the nomenclature LUN/REPORT_LUN for SCSI can be replaced with the nomenclature NSID/IDENTIFY for NVMe.

Having described disadvantages of manual zoning and TDZ, and conventional logical partition discovery, autozoning embodiments (referred to simply as "autozoning") that overcome the disadvantages and offer other advantages are described below in connection with FIGS. 5-9.

Figure 5:
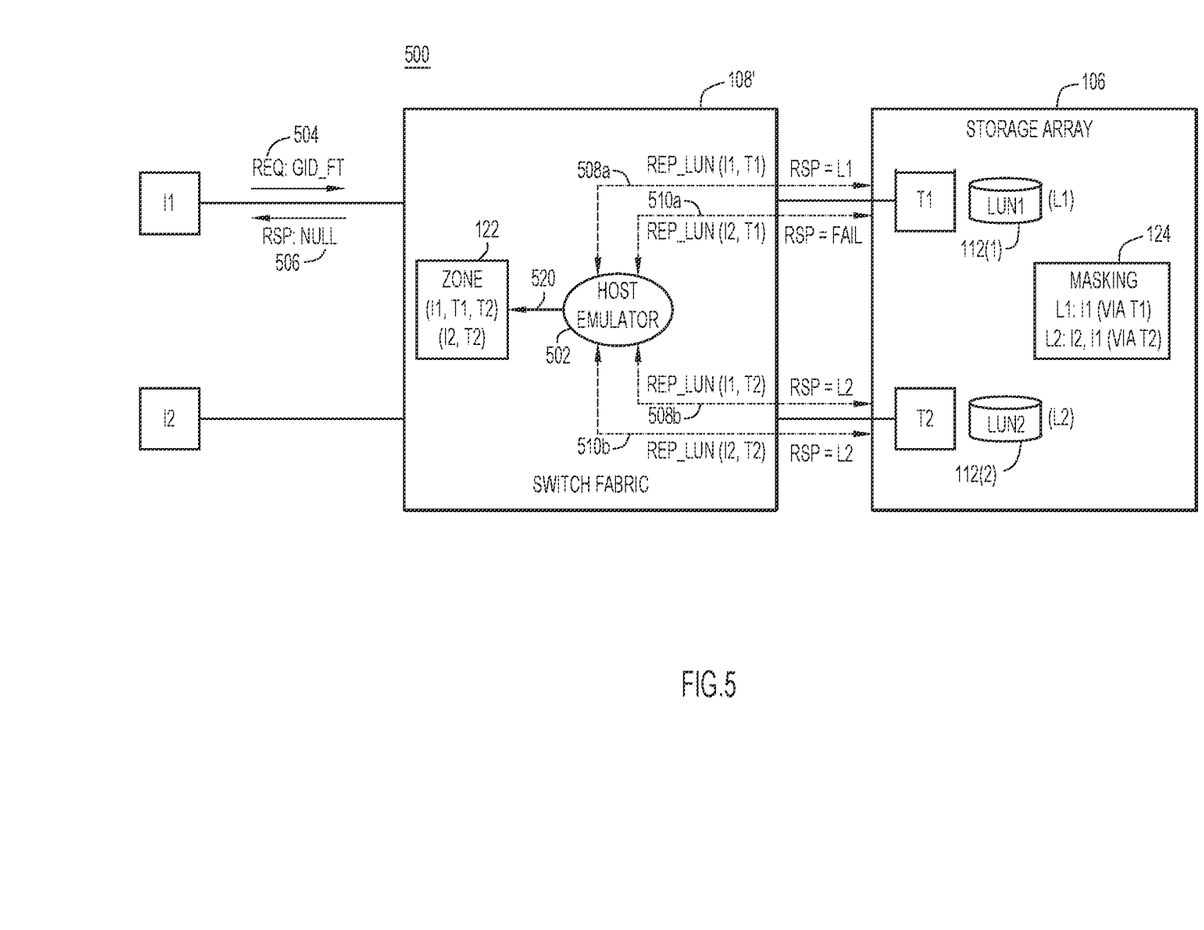
FIG. 5 is an illustration of complete autozoning performed by an initiator emulator hosted in a switch fabric of an FC-SAN, according to an example embodiment.

With reference to FIG. 5, there is an illustration of FC-SAN 500, in which autozoning may be performed. FC-SAN 500 is similar to FC-SAN 100, except that in FC-SAN 500, a switch fabric 108' includes an initiator emulator 502 (also be referred to as a "host emulator 502"), implemented on a control plane of the switch fabric. Initiator emulator 502 is primarily responsible for performing operations that implement the autozoning. Initiator emulator 502 may be implemented as an application or service hosted on a single FC switch, e.g., a modified version of FC switch 110(1). Alternatively, initiator emulator 502 may be distributed across multiple FC switches in switch fabric 108', e.g., as a distributed zoning process.

To implement autozoning, initiator emulator 502 performs the following primary functions:
  a. On behalf of initiator ports, i.e., acting as proxy for the initiator ports, discover/deduce the logical partition masking (e.g., LUN masking) enforced at every target port logged into switch fabric 108, and compute/determine all the (I, T) port combinations that should be allowed access via the switch fabric. The terms "tuples" and "combinations" are synonymous and may be used interchangeably.
  b. Configure all of the allowed (I, T) port tuples as zones in switch fabric 108. This includes injecting all the allowed (I, T) port tuples as the zones in switch fabric 108, and activating the zones.
  c. Over time, again acting as proxy for the initiator ports, update the zones to reflect any changes to the logical partition masking.

Since both functions (a), (b), and (c) are performed primarily at FC switches of switch fabric 108', the autozoning advantageously automates zoning without involving any end devices, such as the initiator ports, the storage array, and the target ports. Also, there is a reduced possibility of deducing zones incorrectly, because initiator emulator 502 derives the zones from the administratively configured logical partition masking.

Functions (a), (b), and (c) are now described in detail with continued reference to FIG. 5, and based on the following initial assumptions:
  a. Zones are not yet configured on switch fabric 108.
  b. Initiator ports I1, I2 are not yet logged into switch fabric 108, i.e., they have not yet performed FLOGI.
  c. Target ports T1, T2 are logged into switch fabric 108.
  d. Logical partition masking is configured on storage array 106, as shown.

In the ensuing description of autozoning, the logical partitions and the logical partition masking are described in the context of LUNs and LUN masking for SCSI, respectively, by way of example only. The description applies equally to NSIDs and NSID masking for NVMe.

Autozoning begins when initiator port I1 performs FLOGI to login to switch fabric 108'. After FLOGI, at 504, initiator port I1 sends to switch fabric 108' (and the switch fabric receives) a request for a list of target ports that are presently logged into the switch fabric. The request may include a Get Port IDs (GID) FC-4 Type (FT) (GID_FT) request. Responsive to the request, at 506, because no zone has been activated in switch fabric 108', the switch fabric sends to initiator port I1 a dummy null responsive indicating there are no target ports logged into the switch fabric, even when target ports (e.g., T1 and T2) are logged into the switch fabric. For example, switch fabric 108' responds to GID_FT with a corresponding null response. The dummy null response prevents initiator port I1 from initiating target port discovery or conventional LUN discovery on target ports T1, T2 over switch fabric 108'.

After initiator port I1 login, at 508a, 508b (described in more detail below), initiator emulator 502 acts as proxy for initiator port I1 and performs proxy-originated LUN discovery to deduce/discover, on behalf of the initiator port, LUNs and target ports that are accessible to initiator port I1. In other words, initiator emulator 502 performs LUN discovery on each of target ports T1, T2 on behalf of initiator port I1 to discover the LUNs behind each of the target ports to which initiator I1 has access. To do this, initiator emulator 502 exchanges LUN discovery commands (e.g., REPORT_LUN request/response), originated at the initiator emulator, with each of target ports T1, T2. Initiator port I1 does not exchange any LUN discovery commands with target ports T1, T2 because it is not aware of the existence of the target ports. Operations 508a, 508b may be performed in parallel with operations 504 and 506.

When exchanging the LUN discovery commands with target ports T1, T2, initiator emulator 502 uses an SID=FCID of initiator port I1 in the REPORT_LUN request in order to impersonate the initiator port to the target ports. Because storage array 106 performs LUN masking checks based on the SID in the LUN discovery request, the queried target port returns the same response as if the actual initiator port I1 had initiated/originated the LUN discovery request. In other words, target ports T1, T2 respond to the LUN discovery requests originated at initiator emulator 502 as if the LUN discovery requests had originated from initiator port I1.

More specifically, in the example of FIG. 5, at operation 508a, initiator emulator 502 sends to target port T1 a REPORT_LUN request with (SID, DID)=(initiator port I1 FCID, target port T1 FCID) (or more simply (I1, T1)), and receives from target port T1 a REPORT_LUN response RSP=L1, meaning that initiator port I1 can access LUN L1 via target port T1. Based on the exchange of LUN discovery commands, initiator emulator 502 deduces/determines that initiator port I1 should be allowed access to target port T1 through switch fabric 108', and records a valid/allowed (I1, T1) port tuple.

Similarly, at 508b, initiator emulator 502 sends to target port T2 a REPORT_LUN request with (SID, DID)=(I1, T2), and receives from target port T2 a REPORT_LUN response RSP=L2, meaning that initiator port I1 should be allowed to access LUN L2 via target port T2. Based on the response, initiator emulator 502 deduces that initiator port I1 should be allowed access to target port T2 through switch fabric 108', and records a valid/allowed (I1, T2) port tuple.

After initiator port I2 performs its login to switch fabric 108', operations 504 and 506 are repeated with respect to initiator port I2. Also, at 510a, 510b, initiator emulator 502 proxies for initiator port I2 to discover which LUNs and target ports are accessible to initiator port I2, similar to operations 508(a), 508(b). That is, initiator emulator 502 exchanges LUN discovery commands with target ports T1, T2 on behalf of initiator port I2. In operations 510a, 510b, initiator emulator 502 uses SID=FCID of initiator port I2 in order to impersonate initiator port I2 to target ports T1, T2.

More specifically, at 510a, initiator emulator 502 sends to target port T1 a REPORT_LUN request with (SID, DID)= (I2, T1), and receives from target port T1 a REPORT_LUN response RSP=FAIL/null list, meaning that initiator port I2 cannot access LUN L1 via target port T1. The response indicates that initiator port I2 should not be allowed access to target port T1 through switch fabric 108'. Based on the response, initiator emulator 502 deduces and records an invalid (I2, T1) port tuple. At 510b, initiator emulator 502 sends to target port T2 a REPORT_LUN request with (SID, DID)=(I2, T2), and receives from target port T2 a REPORT_LUN response RSP=L2, meaning that initiator port I2 should be allowed to access LUN L2 via target port T2. The response indicates that initiator port I2 should be allowed access to target port T2 through switch fabric 108'. Based on the response, initiator emulator 502 deduces and records a valid/allowed (I2, T2) port tuple.

As a result of the above-described LUN discovery commands/exchanges 508a, 508b, 510a, and 510b initiated/originated at initiator emulator 502, the initiator emulator has recorded (i) all valid/allowed (I, T) port tuples/combinations (I1, T1), (I1, T2), and (I2, T2) that should be allowed access via zones configured on switch fabric 108', and (ii) the invalid/disallowed (I2, T1) port tuples.

After LUN discovery, at 520, initiator emulator 502 configures switch fabric 108' with all of the allowed port tuples/combination deduced from the above-described "proxy" LUN discovery as one or more zones in zoning database 122. To do this, initiator emulator 502 stores the zones in zoning database 122, injects the zones into switch fabric 108', and activates the injected zones, i.e., performs zone activation.

Figure 6:
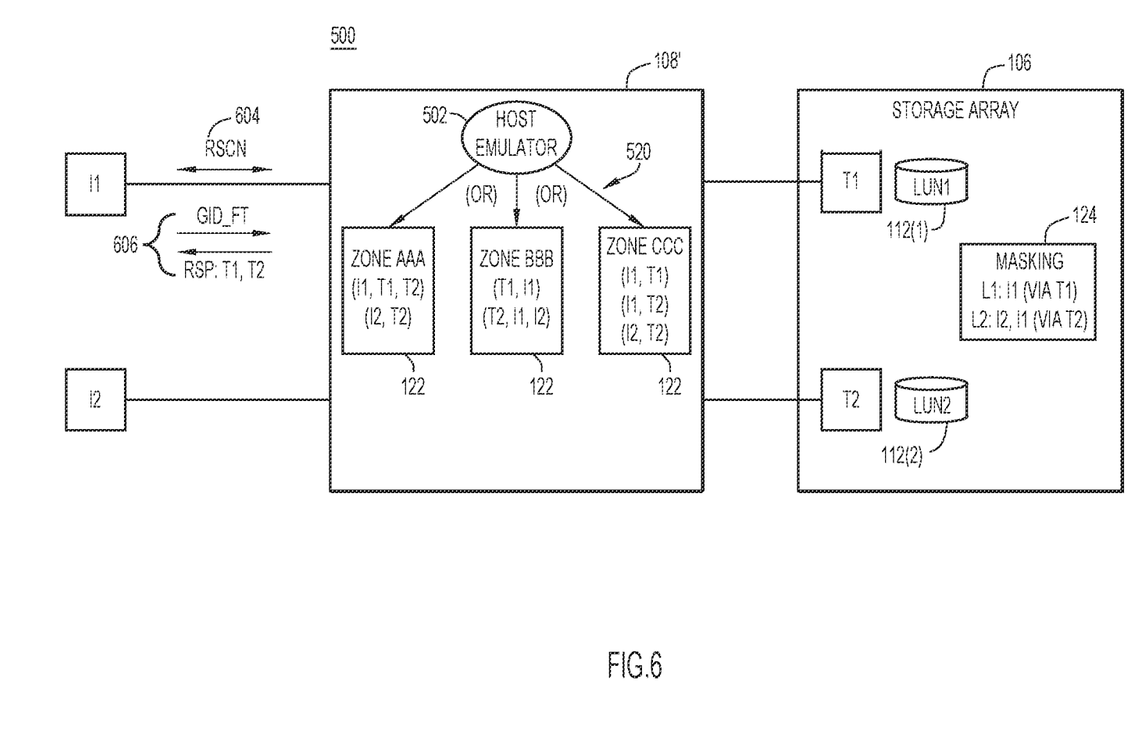
FIG. 6 is an illustration of operations expanding on a zone configuring operation of the autozoning from FIG. 5, and subsequent operations related to the autozoning, according to an example embodiment.

With reference to FIG. 6, there is an illustration of operations expanding on zone configuring operation 520, and subsequent operations related to autozoning. In the example of FIG. 6, initiator emulator 502 activates the zones in any one of the following three configurable formats depending on a zone configuration policy accessible to the initiator emulator. As shown in FIG. 6, the three configurable formats include:

a. Single initiator, multiple target zone.
E.g., Zone AAA
(I1, T1, T2)
(I2, T2)

b. Single target, multiple initiator zone.
E.g., Zone BBB
(T1, I1)
(T2, I1, I2)

c. Single initiator, single target zone.
E.g., Zone CCC
(I1, T1)
(I1, T2)
(I2, T2)

In addition, initiator emulator 502 names the zone configuration based on a zone naming policy accessible to the initiator emulator. A default zone name may be of the form "AZ_<ASCII_WWPN>)," for example.

After zone activation, at 604, initiator emulator 502 sends to each of initiator ports I1, I2 a notification of a zone change to switch fabric 108'. For example, initiator emulator 502 sends a registered state change notification (RSCN) to each of initiator ports I1, I2. The RSCN triggers target port rediscovery 606 by initiator ports I1, I2. That is, initiator ports I1, I2 send to switch fabric 108' (and the switch fabric receives) respective requests (e.g., GID_FT requests) for a list of targets ports currently logged into the switch fabric. Responsive to the requests, switch fabric 108' sends to initiator ports I1, I2 respective responses listing target ports T1, T2 logged into switch fabric 108' in accordance with the zoning that has now been auto-activated in the switch fabric.

The autozoning described above establishes initial zones in switch fabric 108' based on initial LUN masking configured on storage array 106; however, LUN masking is dynamic. That is, over time, an administrator may change or update the LUN masking in a way that impacts/changes the zones. For example, the administrator may provide an initiator port with access to a LUN to which the initiator port previously did not have access, or remove initiator port access to a LUN. Embodiments presented herein periodically update the zones in response to changes in the LUN masking that may occur over time, as described below in connection with FIG. 7.

Figure 7:
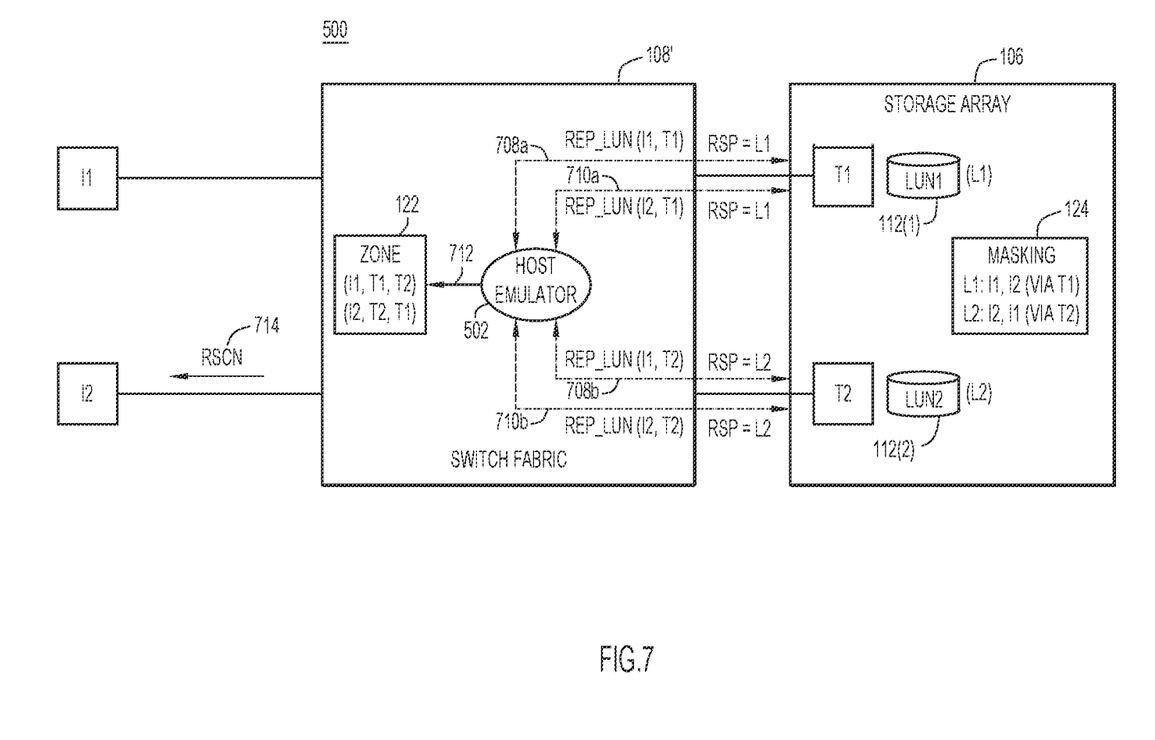
FIG. 7 is an illustration of zone updating using periodic proxy probing by the initiator emulator in the FC-SAN of FIG. 5, according to an example embodiment.

With reference to FIG. 7, there is an illustration of example operations used to update zones in switch fabric 108' responsive to updates to LUN masking in storage array 106. The example of FIG. 7 assumes FC-SAN 500 is initially configured with the LUN masking and zones resulting from autozoning as described above in connection with FIGS. 5 and 6. At some time after the autozoning described above, an administrator changes or updates the LUN masking to provide initiator port I2 with access to LUN L1 via target port T1. The change allows the (I2, T1) port combination that was previously disallowed.

To discover the LUN masking update, initiator emulator 502 initiates periodic proxy-based LUN discovery probes on behalf of initiator ports I1, I2 to discover the LUN masking updates. That is, initiator emulator 502 periodically sends to each of target ports T1, T2 REPORT_LUN requests to discover the changes to the LUN masking. Thus, initiator emulator 502 exchanges REPORT_LUN commands with target ports T1, T2 in the same way as described above. Initiator emulator 502 again deduces all of the allowed (and disallowed) (I, T) port tuples based on the resulting REPORT_LUN responses from target ports T1, T2. Initiator emulator 502 updates the zones to reflect all of the changes to the initial allowed (I, T) port tuples detected using the periodic LUN masking probes. Initiator emulator injects and activates the updated zones, and then sends the RSCN to initiator ports I1, I2.

More specifically, in the example of FIG. 7, initiator emulator 502 initiates/originates periodic proxy probes (i.e., LUN discovery commands) 708a, 708b, 710a, and 710b to discover the LUN masking update. Proxy probe 710a issued by initiator emulator 502 on behalf of I2 discovers the LUN masking update (RSP=L1 for (I2, T1)), and deduces the allowed tuple (I2, T1) that was previously disallowed. At 712, initiator emulator 502 updates the zones to also reflect the allowed tuple (I2, I1), and activates the updated zones. As a result of the zone update, at 714, initiator emulator 502 sends RSCN to affected initiator port I2. That is, initiator emulator 502 sends the RSCN only to the changed zone member, e.g., initiator port I2.

The aforementioned use of periodic probes to accommodate LUN masking updates is one option. As an alternative, for removing auto-zones (e.g., when target-side LUN mapping is removed), additional information from analytics may be used, or internal port counters for monitoring traffic/flows may be used, to ensure there is no traffic flowing between a pair of initiator/target ports, after which a probe of the target port (which is not strictly a periodic probe) may be used to remove the zone created earlier. Thus, more generally, LUN masking updates may be accommodated using either peridoc probes or any other mechanism, such as using internal-counters/analytics data or other data.

In the example of FIG. 7, while initiator emulator 502 sends the proxy-based (i.e., initiator emulator originated) periodic probes to target ports T1, T2, initiator ports I1, I2 may also send to the target ports "normal" fabric messages, such as LUN discovery commands. To avoid confusion, the switch fabric differentiates between responses to the periodic probes destined for initiator emulator 502, and responses properly destined for the initiator port. For example, during the proxy probing, switch fabric 108' ensures that REPORT_LUN responses sent by target ports reach initiator emulator 502, not the initiator ports being proxied by the initiator emulator.

To ensure proper routing of the REPORT_LUN responses to proxy probes to initiator emulator 502, an ACL trap entry is programmed on F-ports of switch fabric 108'. The ACL trap entry (referred as an "autozoning ACL trap" entry) redirects the REPORT_LUN responses (and also Port Login (PLOGI)/Process Login (PRLI) responses) to initiator emulator 502 based on a special field (referred to as a "initiator emulator trap flag") installed in the responses and recognized by the ACL trap entry. To trigger the ACL trap entry, initiator emulator 502 includes a Special OXID (SplOXID) value into each REPORT_LUN request (e.g., into an FC header of an FC frame for the REPORT_LUN request), which is mirrored in the REPORT_LUN response sent by the responding target port. That is, the REPORT_LUN request and corresponding REPORT_LUN response each include the SplOXID value. The OXID=0xFFFF is defined by the FC Framing and Signaling (FS)(FC-FS) standard as an unassigned value and is unlikely to be used by any real/actual initiator ports.

Initiator emulator 502 may rely on an ACL match on SplOXID as a fail-safe scheme so as to not trap any real/actual I/O traffic unintentionally. In an example, an entry for the ACL trap may include the following:
Match on FC header includes DID=InitiatorFCID, OXID=SplOXID, Routing Control (RCTL)=0x1|0x7 (SuccessiFailure)→Permit with Next-Hop=Superviser (SUP)-Virtual Queuing Index (VQI).

The entry above (i) traps on a response from a target port that includes either a Success (0x1) (e.g., initiator port can access LUN through target port) or a Failure (0x7) (e.g., initiator port cannot access LUN through target port), and (ii) the directive "Next-Hop SUP" causes the switch fabric to direct the response to the control plane "SUP" (i.e., initiator emulator 502) of the switch fabric, i.e., the response is directed only to the control plane.

The use of the OXID=SplOXID and the ACL trap entry may also optionally be used during the initial LUN discovery operations 508a, 508b, 510a, and 510b that occur before the proxy-based updating; however, the need for the ACL trap entry during that phase is less pressing because the null response to the GID_FT (504, 506 described above) prevents initiator ports I1, I2 from originating LUN discovery requests.

With the above-described zoning update process, proxy-based probing, zoning, and LUN masking can be "out-of-sync" for a time period up to a probe refresh interval period, i.e., the time between sending consecutive proxy-based probes.

Figure 8:
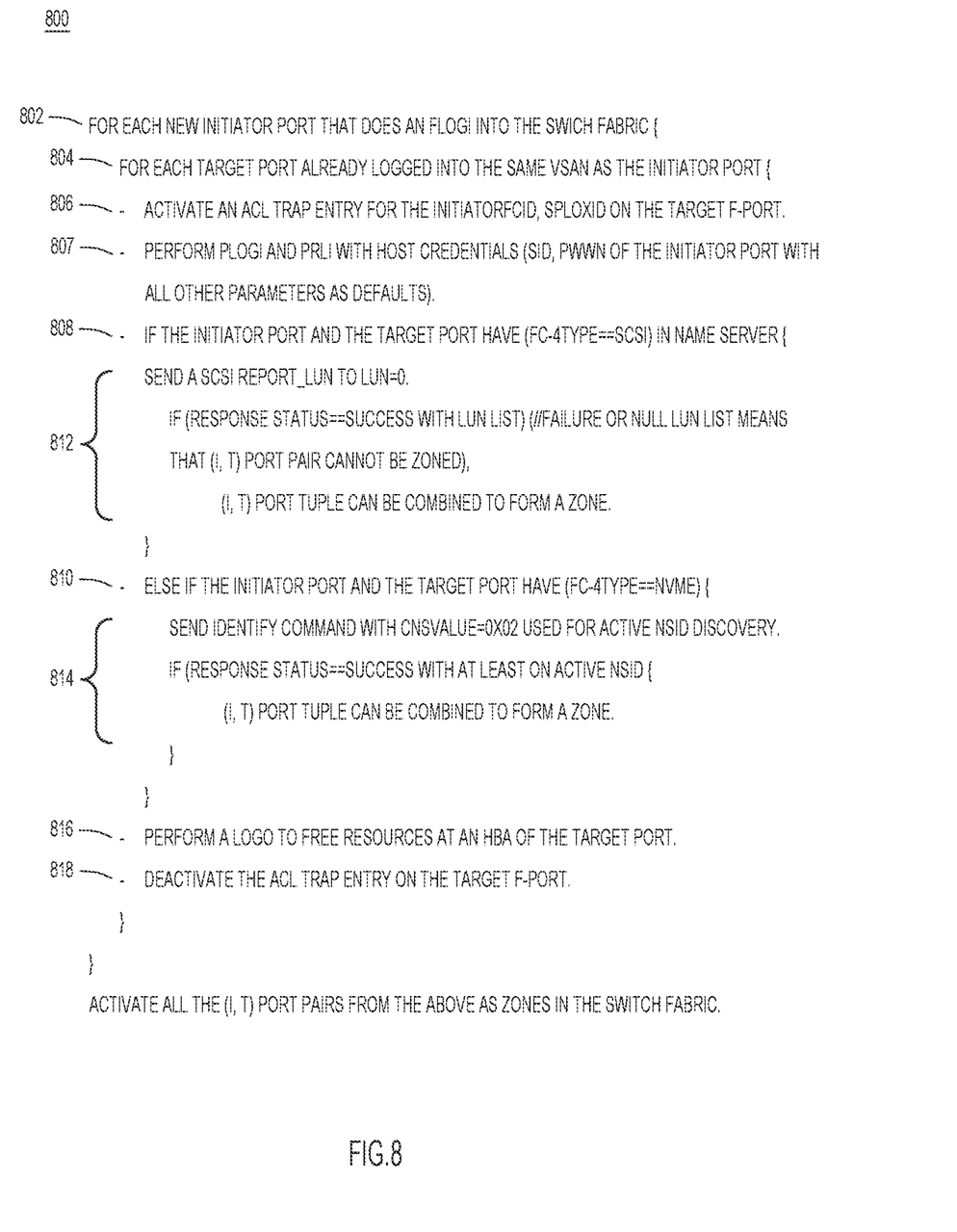
FIG. 8 is an illustration of autozoning pseudocode, according to an example embodiment.

With reference to FIG. 8, there is an illustration of example pseudocode 800 for implementing autozoning operations described above for each virtual SAN (VSAN) configured on a switch fabric. Pseudocode 800 may be implemented by initiator emulator 502. Pseudocode 800 includes an outer loop 802 repeated for each new initiator port that logs into switch fabric 108', and an inner loop 804 repeated for each target port logged into the same VSAN in the switch fabric as the initiator port in the current loop. Operation 806 activates an ACL trap entry as described above on the F-ports so that LUN discovery responses that include the initiator emulator trap flag are directed to initiator emulator 502, not initiator ports. Operation 807 performs PLOGI and PRLI with host credentials of the initiator port. Operations 808/810 detect the SCSI or NVMe FC4 type of the device and perform discovery operations 812/814 accordingly. Operation 816 performs a logout (LOGO) to free HBA resources associated with the target port. Operation 818 deactivates the ACL trap entry to enable a normal flow of switch fabric commands.

Figure 9:
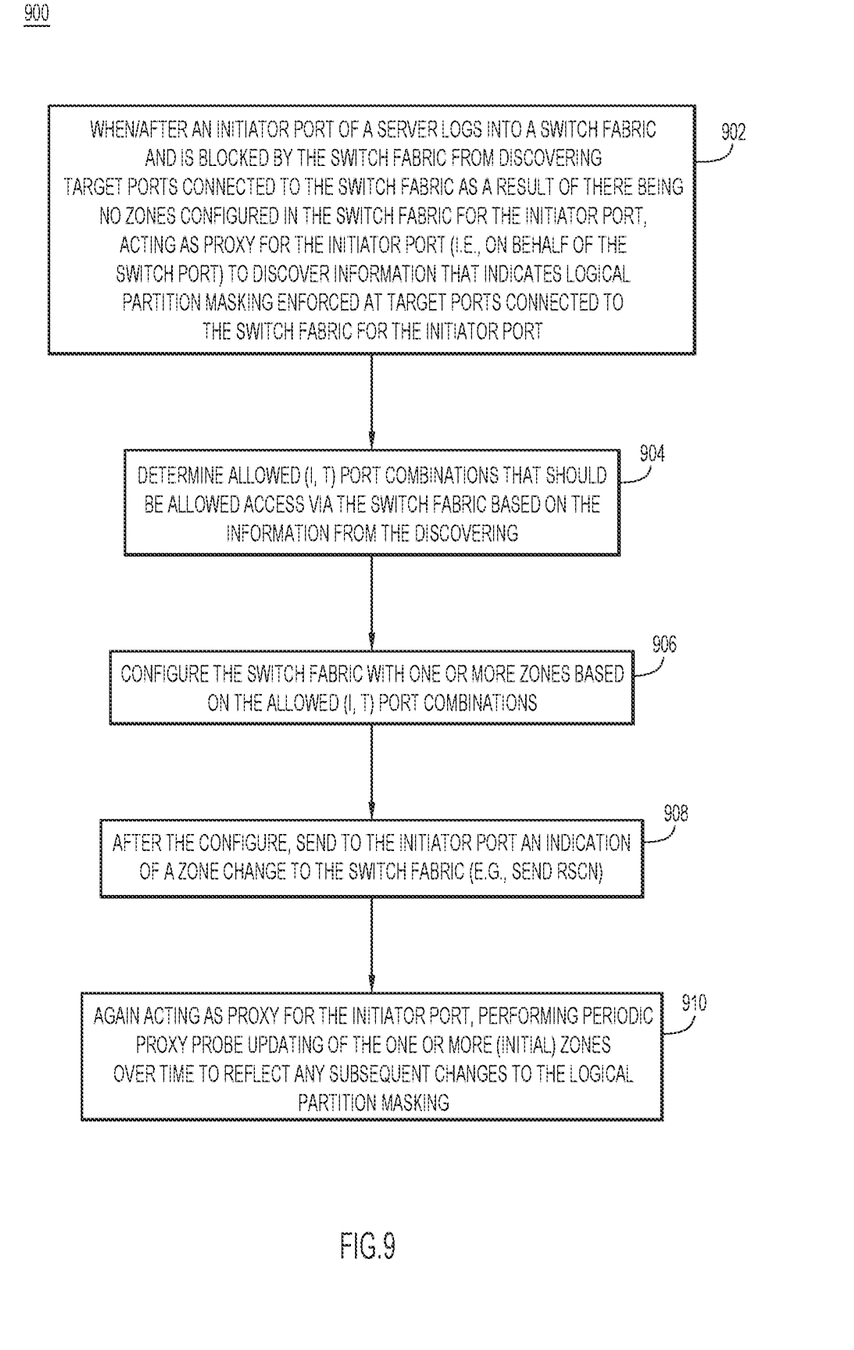
FIG. 9 is a flowchart of a method of autozoning, according to an example embodiment

With reference to FIG. 9, there is a flowchart of an example method of autozoning 900 performed primarily by initiator emulator 502 in FC-SAN 500. Method 900 includes operations described above in connection with FIG. 5-9.

At 902, an initiator port of a server logs into a switch fabric and, due to there being no zones in the switch fabric involving the initiator port, the switch fabric blocks the initiator port from discovering target ports by returning a null result in its (i.e., the switch fabric's) response to name server queries from the initiator port. After the login and the initiator port being blocked by the switch fabric from discovering the target ports, initiator emulator 502 acts as proxy for the initiator port to discover from the target ports information (on behalf of the initiator port) that indicates logical partition masking (e.g., LUN masking for SCSI or NSID masking for NVMe) enforced at the target ports for the initiator port. The initiator port is not involved with the discovery. The discovery includes exchanging logical partition discovery commands (e.g., FC-4Type discovery commands, such as LUN discovery commands for SCSI or IDENTIFY commands for NVMe) originated at the initiator emulator with the target ports. For example, initiator emulator 502 sends, to the target ports, logical partition discovery requests originated at the initiator emulator and that include a source identifier that matches an identifier of the initiator port. Initiator emulator 502 also receives, from the target ports, logical partition discovery responses that include the information indicating the logical partition masking.

At 904, initiator emulator 502 determines allowed (I, T) port combinations that should be allowed access via the switch fabric based on the information discovered at 902.

At 906, initiator emulator 502 configures the switch fabric with one or more (initial) zones based on the allowed (I, T) port combinations. That is, initiator emulator 502 injects the one or more zones into the switch fabric and activates the injected zones on the switch fabric.

At 908, initiator emulator sends to the initiator port an indication of a zone change (e.g., an RSCN) to the switch fabric, which triggers the initiator port to discover the target ports on its own behalf.

After operations 902-908, at 910, initiator emulator 502 performs periodic proxy probe-based updating of the one or more (initial) zones over time to reflect any subsequent changes to the logical partition masking. For example, again acting as proxy for the initiator port, initiator emulator 502 performs periodic probing of the target ports (on behalf of the initiator port) for change information indicating a change to the logical partition masking enforced at the target ports. This includes periodically exchanging logical partition discovery commands with the target ports. Initiator emulator 502 determines a change to the allowed (I, T) port combinations based on the change information. Initiator emulator 502 updates the one or more zones to reflect the change to the allowed (I, T) port combinations. In an example, operation 910 may use a resettable probe timer to trigger the periodic probes periodically on expiry of the probe timer. More specifically, operation 910 repeatedly: (i) resets the probe timer, (ii) when the probe timer expires, cause initiator emulator 502 to originate/send to the target ports respective proxy probes, and return flow to (i) (i.e., to reset the probe timer and repeat (ii)).

Method 900 is repeated for each switch port that logs into the switch fabric and, for each switch port, across all of the target ports logged into the switch fabric.

Figure 10:
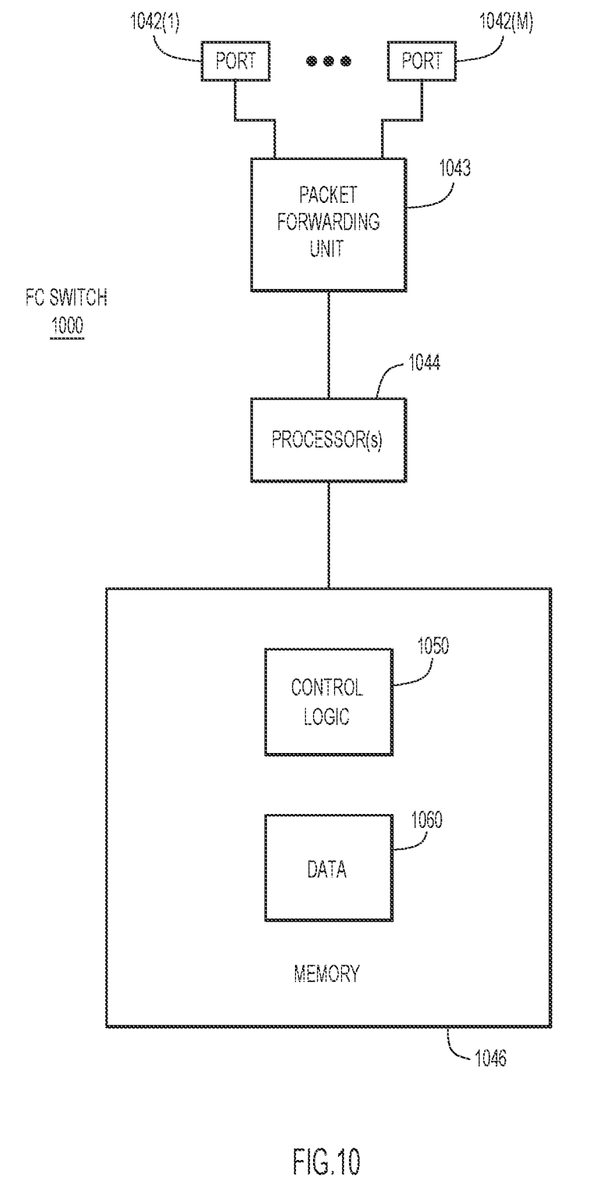
FIG. 10 is a block diagram of an FC switch configured to implement autozoning, according to an example embodiment.

With reference to FIG. 10, there is a block diagram of an FC switch 1000 of switch fabric 108' configured with an initiator emulator to perform autozoning as described above. FC switch 1000 may be representative of each of FC switches 110, but configured with the initiator emulator. Switch 1000 comprises a plurality of FC ports 1042(1)-1042(M) to send FC frames/packets transporting SCSI/NVMe information to a network (including, e.g., other FC switches in FC switch fabric 108', servers 104, and storage array 106) and receive FC frames/packets transporting with NVMe/SCSI information to the network, a packet forwarding/processing unit 1043, a network processor 1044 (also referred to simply as "processor"), and a memory 1046. The packet forwarding/processing unit 1043 is, for example, one or more application specific integrated circuits that include buffers, queues, and other control logic for performing packet forwarding operations. The packet forwarding/processing unit may store ACL entries. The processor 1044 is a microcontroller or microprocessor that is configured to perform higher-level controls of switch 1000. To this end, the memory 1046 stores software instructions that, when executed by the processor 1044, cause the processor 1044 to perform a variety of operations including operations described herein. For example, the memory 1046 stores instructions for control logic 1050, including, but not limited to, initiator emulator logic to perform operations described herein. Memory 1046 also stores data 1060 used and generated by control logic 1050.

Memory 1046 may comprise read only memory (ROM), random access memory (RAM), magnetic disk storage media devices, optical storage media devices, flash memory devices, electrical, optical, or other physical/tangible memory storage devices. Thus, in general, the memory 1046 may comprise one or more tangible (e.g., non-transitory) computer readable storage media (e.g., a memory device) encoded with software comprising computer executable instructions and when the software is executed (by the processor 1044) it is operable to perform the operations described herein in connection with logic 1050.

In summary, in one form, a method is provided comprising: at an initiator emulator implemented on a control plane of a switch fabric connected to target ports of a storage array having storage configured with logical partitions: after an initiator port of a server logs into the switch fabric and is blocked by the switch fabric from discovering the target ports as a result of there being no zones configured in the switch fabric for the initiator port, acting as proxy for the initiator port, discovering information that indicates logical partition masking enforced at the target ports for the initiator port; determining allowed (initiator (I), target (T)) (I, T) port combinations that should be allowed access via the switch fabric based on the information obtained from the discovering information; configuring the switch fabric with one or more zones based on the allowed (I, T) port combinations; and sending to the initiator port an indication of a zone change to the switch.

In another form, an apparatus is provided comprising: switch ports configured to be connected to a switch fabric configured to be connected to target ports of a storage array having storage configured with logical partitions; and a processor coupled to the switch ports and configured to implement an initiator emulator of the switch fabric, the initiator emulator configured to perform: after an initiator port of a server logs into the switch fabric and is blocked by the switch fabric from discovering the target ports as a result of there being no zones configured in the switch fabric for the initiator port, acting as proxy for the initiator port, discovering information that indicates logical partition masking enforced at the target ports for the initiator port; determining allowed (initiator (I), target (T)) (I, T) port combinations that should be allowed access via the switch fabric based on the information obtained from the discovering information; configuring the switch fabric with one or more zones based on the allowed (I, T) port combinations; and sending to the initiator port an indication of a zone change to the switch fabric.

In yet another form, a non-transitory computer readable medium is provided. The computer readable medium is encoded with instruction that, when executed by a processor in a switch fabric configured to be connected to target ports of a storage array having storage configured with logical partitions, cause the processor to implement an initiator emulator, the initiator emulator configured to perform: after an initiator port of a server logs into the switch fabric and is blocked by the switch fabric from discovering the target ports as a result of there being no zones configured in the switch fabric for the initiator port, acting as proxy for the initiator port, discovering information that indicates logical partition masking enforced at the target ports for the initiator port; determining allowed (initiator (I), target (T)) (I, T) port combinations that should be allowed access via the switch fabric based on the information obtained from the discovering information; configuring the switch fabric with one or more zones based on the allowed (I, T) port combinations; and sending to the initiator port an indication of a zone change to the switch fabric.

The above description is intended by way of example only. Various modifications and structural changes may be made therein without departing from the scope of the concepts described herein and within the scope and range of equivalents of the claims.

What is claimed is:

1. A method comprising:
at an initiator emulator implemented on a control plane of a switch fabric connected to target ports of a storage array having storage configured with logical partitions:
after an initiator port of a server logs into the switch fabric and is blocked by the switch fabric from discovering the target ports as a result of there being no zones configured in the switch fabric for the initiator port, acting as proxy for the initiator port, discovering information that indicates logical partition masking enforced at the target ports for the initiator port by sending, to the target ports, logical partition discovery requests originated at the initiator emulator and that include a source identifier that matches an identifier of the initiator port, and receiving, from the target ports, logical partition discovery responses that include the information that indicates the logical partition masking;
determining allowed (initiator (I), target (T)) (I, T) port combinations that should be allowed access via the switch fabric based on the information obtained from the discovering information;
configuring the switch fabric with one or more zones based on the allowed (I, T) port combinations; and
sending to the initiator port an indication of a zone change to the switch fabric.

2. The method of claim 1, wherein sending and receiving represent exchanging logical partition discovery commands originated at the initiator emulator with the target ports on behalf of the initiator port.

3. The method of claim 1, wherein the logical partitions include logical units identified by logical unit numbers or include namespaces identified by namespace identifiers.

4. The method of claim 1, further comprising, at the initiator emulator:
not forwarding the logical partition discovery responses to the initiator port.

5. The method of claim 1, wherein the configuring includes configuring the one or more zones as one of:
a single initiator, single target zone;
a single initiator, multiple target zones; and
a single target, multiple initiator zones.

6. The method of claim 1, further comprising, at the initiator emulator:
acting as proxy for the initiator port to perform periodically probing the target ports on behalf of the initiator port for change information indicating a change to the logical partition masking enforced at the target ports;
determining a change to the allowed (I, T) port combinations based on the change information; and
updating the one or more zones to reflect the change to the allowed (I, T) port combinations.

7. The method of claim 6, wherein the periodically probing includes periodically exchanging logical partition discovery commands with the target ports, and the logical partition discovery commands include logical partition discovery requests originated at the initiator port and logical partition discovery responses from the target ports and that are responsive to the logical partition discovery requests.

8. The method of claim 7, wherein the logical partition discovery commands each include an initiator emulator trap flag, and the method further comprises:
programming, on an edge of the switch fabric connected to the target ports, an access control list trap configured to direct the logical partition discovery responses to the initiator emulator based on the initiator emulator trap flag in the logical partition discovery responses.

9. The method of claim 1, further comprising, at the initiator emulator:
after the initiator port logs into the switch fabric and before the discovering information, upon receiving from the initiator port a request for a list of target ports logged into the switch fabric, sending to the initiator port a null list to prevent the initiator port from initiating target port discovery.

10. The method of claim 1, wherein the switch fabric includes a Fibre Channel (FC) switch fabric that includes FC switches.

11. The method of claim 10, wherein the FC switch fabric operates in accordance with a Small Computer System Interface (SCSI) protocol or a Non-Volatile Memory Express (NVMe) protocol.

12. An apparatus comprising:
switch ports configured to be connected to a switch fabric configured to be connected to target ports of a storage array having storage configured with logical partitions; and
a processor coupled to the switch ports and configured to implement an initiator emulator of the switch fabric, the initiator emulator configured to perform:
after an initiator port of a server logs into the switch fabric and is blocked by the switch fabric from discovering the target ports as a result of there being no zones configured in the switch fabric for the initiator port, acting as proxy for the initiator port, discovering information that indicates logical partition masking enforced at the target ports for the initiator port by sending, to the target ports, logical partition discovery requests originated at the initiator emulator and that include a source identifier that matches an identifier of the initiator port, and receiving, from the target ports, logical partition discovery responses that include the information that indicates the logical partition masking;
determining allowed (initiator (I), target (T)) (I, T) port combinations that should be allowed access via the switch fabric based on the information obtained from the discovering information;
configuring the switch fabric with one or more zones based on the allowed (I, T) port combinations; and
sending to the initiator port an indication of a zone change to the switch fabric.

13. The apparatus of claim 12, wherein sending and receiving represent exchanging logical partition discovery commands originated at the initiator emulator with the target ports on behalf of the initiator port.

14. The apparatus of claim 12, wherein the initiator emulator is configured to perform configuring by configuring the one or more zones as one of:

a single initiator, single target zone;
a single initiator, multiple target zones; and
a single target, multiple initiator zones.

15. The apparatus of claim 12, wherein the initiator emulator is further configured to perform:

acting as proxy for the initiator port to perform periodically probing the target ports on behalf of the initiator port for change information indicating a change to the logical partition masking enforced at the target ports;

determining a change to the allowed (I, T) port combinations based on the change information; and updating the one or more zones to reflect the change to the allowed (I, T) port combinations.

16. The apparatus of claim 12, wherein the switch fabric includes a Fibre Channel (FC) switch fabric configured to operate in accordance with a Small Computer System Interface (SCSI) protocol or a Non-Volatile Memory Express (NVMe) protocol.

17. A non-transitory computer readable medium encoded with instructions that, when executed by a processor in a switch fabric configured to be connected to target ports of a storage array having storage configured with logical partitions, cause the processor to implement an initiator emulator, the initiator emulator configured to perform:

after an initiator port of a server logs into the switch fabric and is blocked by the switch fabric from discovering the target ports as a result of there being no zones configured in the switch fabric for the initiator port, acting as proxy for the initiator port, discovering information that indicates logical partition masking enforced at the target ports for the initiator port by sending, to the target ports, logical partition discovery requests originated at the initiator emulator and that include a source identifier that matches an identifier of the initiator port, and receiving, from the target ports, logical partition discovery responses that include the information that indicates the logical partition masking;

determining allowed (initiator (I), target (T)) (I, T) port combinations that should be allowed access via the switch fabric based on the information obtained from the discovering information;

configuring the switch fabric with one or more zones based on the allowed (I, T) port combinations; and sending to the initiator port an indication of a zone change to the switch fabric.

18. The non-transitory computer readable medium of claim 17, wherein sending and receiving represent exchanging logical partition discovery commands originated at the initiator emulator with the target ports on behalf of the initiator port.

19. The non-transitory computer readable medium of claim 17, wherein the switch fabric includes a Fibre Channel (FC) switch fabric that includes FC switches.

20. The non-transitory computer readable medium of claim 17, wherein the initiator emulator is further configured to perform:

acting as proxy for the initiator port to perform periodically probing the target ports on behalf of the initiator port for change information indicating a change to the logical partition masking enforced at the target ports;

determining a change to the allowed (I, T) port combinations based on the change information; and updating the one or more zones to reflect the change to the allowed (I, T) port combinations.

\* \* \* \* \*